Jan. 29, 1963  M. LEVA  3,075,752
GAS-LIQUID CONTACT TOWER
Filed Dec. 7, 1959  4 Sheets-Sheet 1
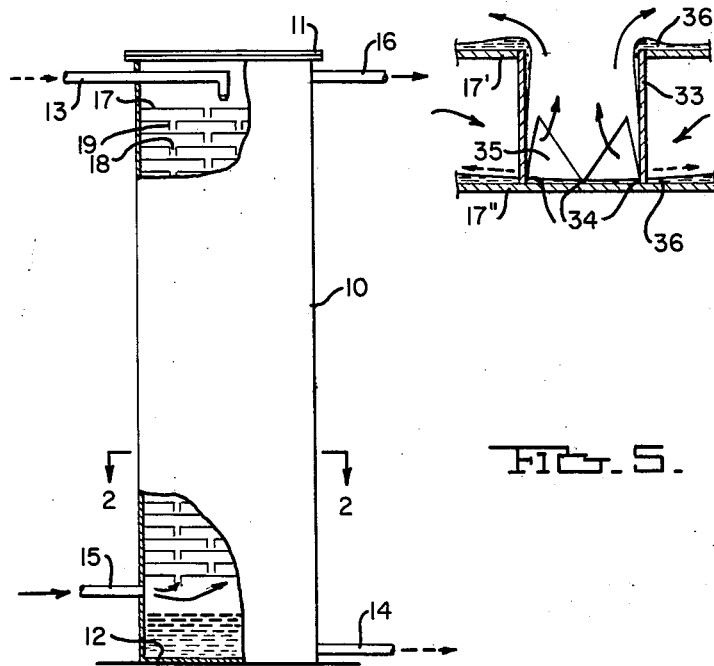
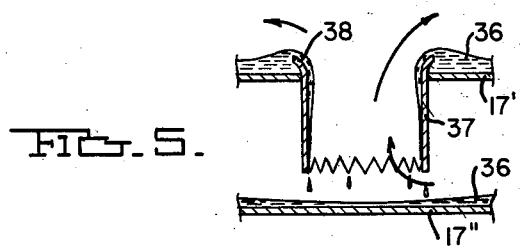
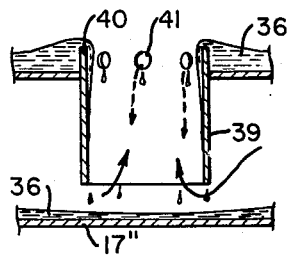
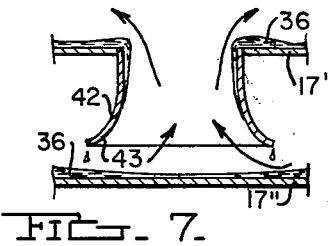
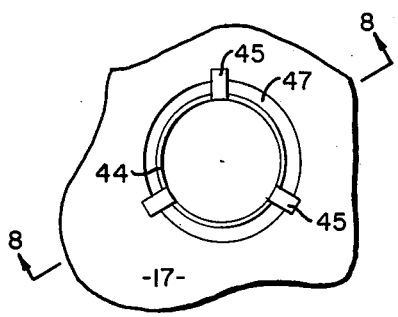
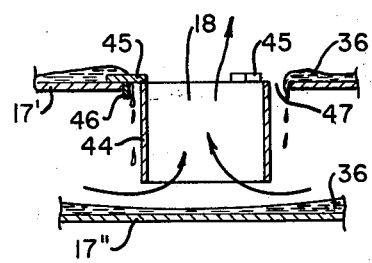
INVENTOR.
MAX LEVA
BY *William M. Epes*
ATTORNEY Jan. 29, 1963 M. LEVA 3,075,752
GAS-LIQUID CONTACT TOWER
Filed Dec. 7, 1959 4 Sheets-Sheet 2

INVENTOR.
MAX LEVA
BY
ATTORNEY

Jan. 29, 1963  M. LEVA  3,075,752
GAS-LIQUID CONTACT TOWER
Filed Dec. 7, 1959  4 Sheets-Sheet 3

INVENTOR.
MAX LEVA
BY *William McGee*
ATTORNEY

Jan. 29, 1963 M. LEVA 3,075,752
GAS-LIQUID CONTACT TOWER
Filed Dec. 7, 1959 4 Sheets-Sheet 4
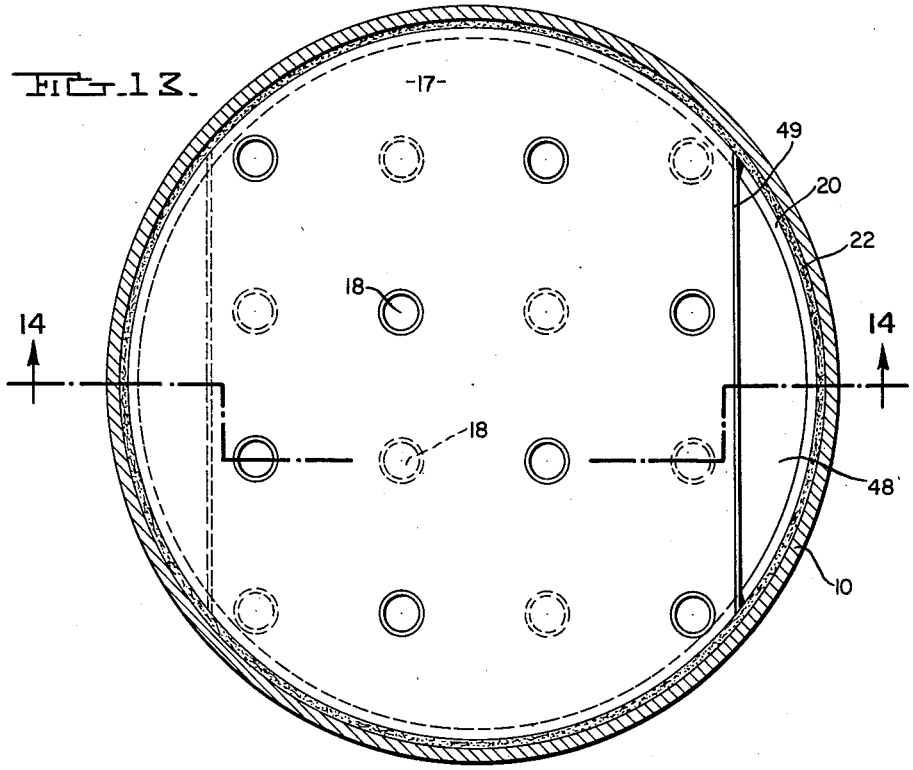
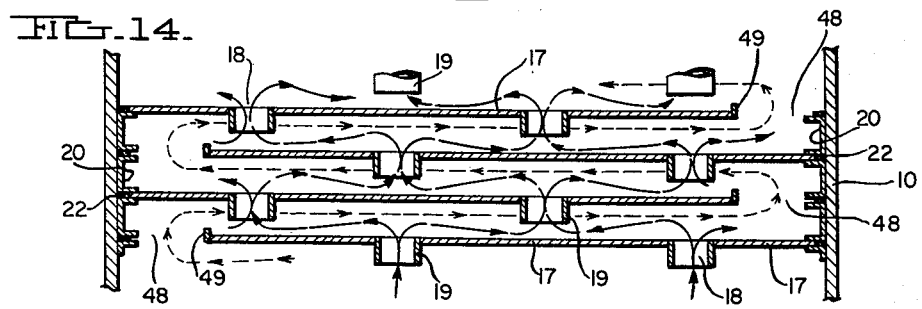
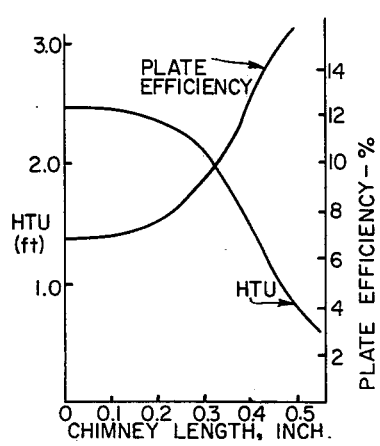
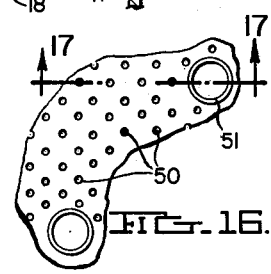
*INVENTOR.*
MAX LEVA
BY
*William M. Epes*
ATTORNEY United States Patent Office 3,075,752
Patented Jan. 29, 1963

3,075,752
GAS-LIQUID CONTACT TOWER
Max Leva, 1030 Dallett Road, Pittsburgh, Pa.
Filed Dec. 7, 1959, Ser. No. 857,995
4 Claims. (Cl. 261—113)

This invention relates to gas-liquid contact apparatus in which the liquid flows downwardly by gravity through a tower, the gas rising upwardly in countercurrent relationship to the liquid.

Gas-liquid contact towers in most common use, such as distillation columns, absorption and stripping columns and the like, are of the packed column type or of the so-called bubble-tray type. In the packed column type, the tower is filled with small, usually randomly disposed bodies in the shape, for example, of rings or saddles and liquid is introduced at the top of the tower wetting the surfaces of these bodies, thus exposing a large amount of liquid surface to the gas stream which rises upwardly through the tower in the interstices between the packing. Such a tower gives satisfactory performance provided the rate of liquid flow is not too low. At low liquid rates which are desirable in many applications, it is difficult or impossible to distribute the liquid flow uniformly over the packing, which in turn leads to poor efficiency.

In the so-called bubble-tray type column, liquid travels down the column by overflowing from one tray to the tray beneath, each tray being covered with liquid to a substantial depth, while gas flowing upwardly through the column is introduced into the liquid layer on each tray by means of so-called bubble caps. While this type of gas-liquid contact tower is well suited for many applications, the gas pressure drop through the column is quite substantial, and furthermore, the gas bubbling through the liquid tends to cause entrainment of liquid droplets in the gas stream. For these reasons, bubble towers are not generally suitable for applications involving high rates of gas flow.

Another type of gas-liquid contact tower in common use, particularly in cooling towers, is a simple arrangement of superimposed perforated plates generally spaced twelve inches or more apart and provided with apertures offset from one another. The liquid trickles down through the tower, dripping through the apertures from one plate to the next, while gas passes upwardly through the tower through the same apertures. In this type of tower, although the gas and liquid flow generally countercurrent to one another, there is relatively poor coordination of the gas and liquid flow and relatively poor contact between gas and the liquid surfaces. There also tends to be an entrainment of the liquid away from the rim of the apertures. All this results in relatively low tower efficiencies, requiring greater tower volume and height, with correspondingly higher pressure drops for a given tower duty.

It is the object of the present invention to provide a gas-liquid contact tower of simple construction which is capable of operation at high efficiencies at moderate or relatively low liquid rates and relatively high rates of gas flow. As will appear more in detail from the subsequent description, this is accomplished by means of a countercurrent gas-liquid contact tower provided with a plurality of relatively closely spaced superimposed apertured horizontal plates, each carrying a thin layer of liquid, and provided with means for greatly improving the coordination of gas and liquid flow while at the same time greatly improving the efficiency of gas and liquid contact. Not only is there a substantial increase in tower efficiency due to the increased mass transfer rates, with resulting decrease in tower volume and height for a given duty, but surprisingly, the overall gas pressure drop through the tower required for a given amount of mass transfer is substantially decreased. Pressure drop per unit mass transfer is a highly important consideration in many applications such as in air conditioning where relatively large quantities of air must be contacted with small quantities of desiccant solutions.

For a detailed description of the invention reference is now made to the accompanying drawings which illustrate preferred embodiments of the invention.

FIG. 1 is a semi-diagrammatic view of a gas-liquid contact tower constructed in accordance with the invention;

Figure 2:
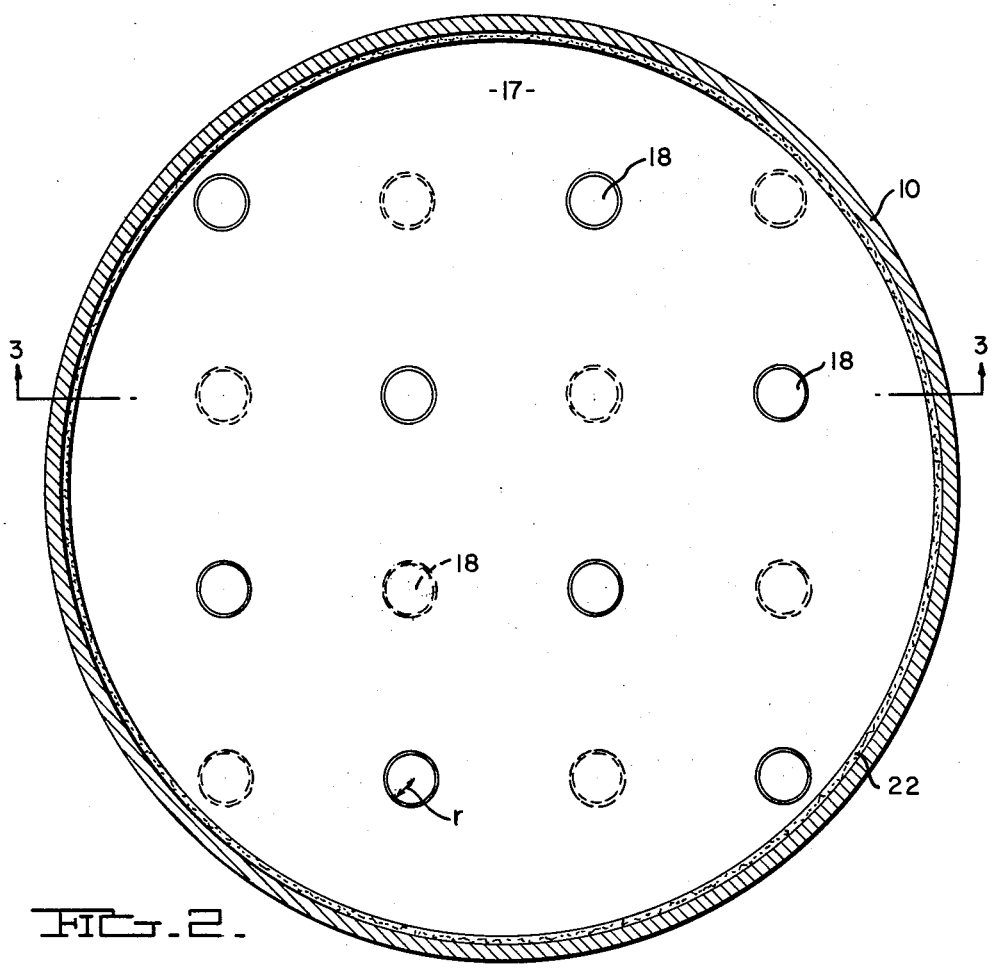
FIG. 2 is a plan view taken on line 2—2 of FIG. 1, showing one of the apertured horizontal plates of the tower.
Figure 3:
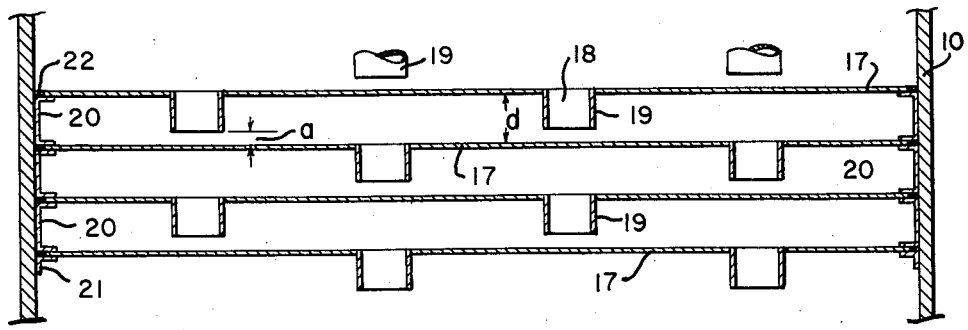
FIG. 3 is a vertical cross-section taken on line 3—3 of FIG. 2, showing several layers of the apertured horizontal plates with associated downwardly extending chimney elements.
Figure 10:
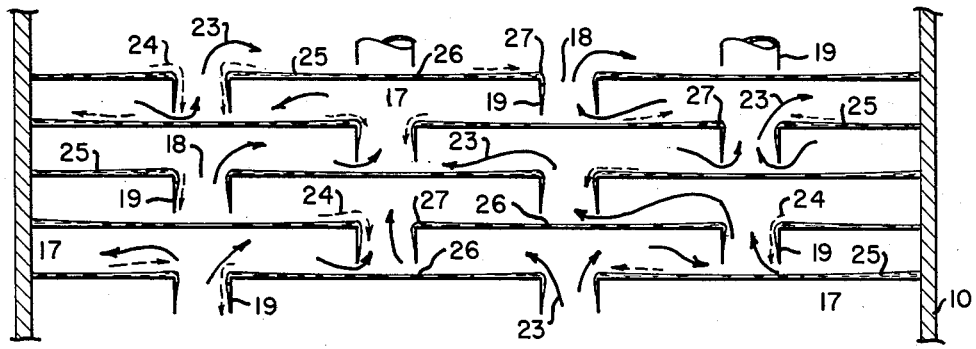
Figure 11:
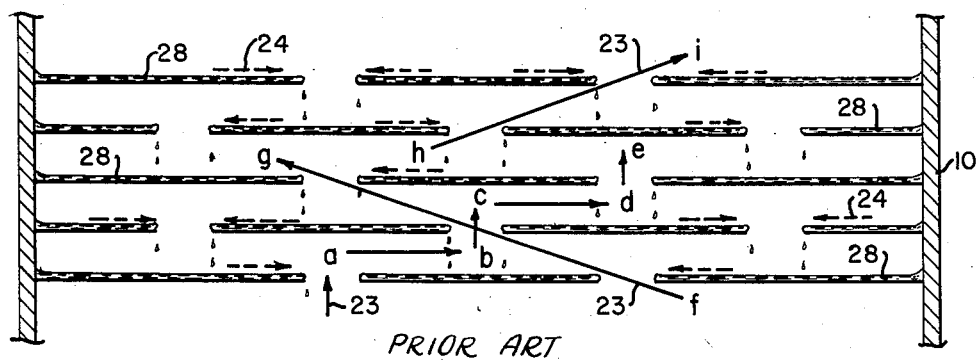
Figure 12:
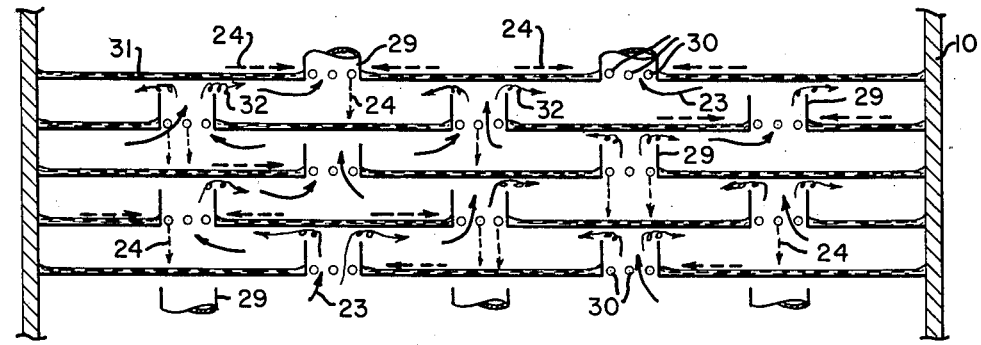

FIGS. 4 through 8 inclusive are vertical cross-sectional views of modified forms of chimney elements adapted to be associated with the apertured horizontal plates of FIGS. 2 and 3;

FIG. 9 is a plan view of the chimney element shown in FIG. 8;

FIG. 10 is a diagrammatic view of several layers of apertured plates with associated downwardly extending chimney elements and illustrating the operation of the gas-liquid contact tower constructed in accordance with the invention with respect to gas and liquid flow;

FIG. 11 is a diagrammatic view illustrating the operation of a so-called drip tower consisting of a plurality of superimposed perforated plates with offset perforations, with respect to gas and liquid flow;

FIG. 12 is a diagrammatic view of a gas-liquid contact tower comprising superimposed apertured plates in which the apertures are provided with upwardly, rather than downwardly, extending chimneys, and showing the operation thereof with respect to gas and liquid flow;

FIG. 13 is a plan view of plates of a modified form in which a relatively large opening is provided at the periphery of each plate, the peripheral openings in adjacent plates being located at essentially opposite sides of the tower;

FIG. 14 is a cross-sectional view of the plate construction of FIG. 13, taken on line 14—14 of FIG. 13;

FIG. 15 is a graph showing the effect of chimney length on tower efficiency;

FIG. 16 is a fragmentary plan view of a modified plate design in which the surface of the plate is provided with a plurality of perforations;

FIG. 17 is a cross-sectional view taken on line 17—17 of FIG. 16.

Referring now to FIG. 1, the reference numeral 10 refers to the wall of a gas-liquid contact tower constructed in accordance with the invention having a flanged cover 11 and a bottom 12. Liquid is admitted into the top of the tower by line 13, and withdrawn from the sump at the bottom of the tower by means of line 14. Gas is admitted into the bottom of the tower by means of gas inlet line 15 and withdrawn from the top of the tower by means of the gas outlet 16. The interior of the tower is provided with a plurality of superimposed horizontal plates 17 which are vertically spaced apart from one another. Each of the plates is provided with a plurality of apertures 18 distributed substantially uniformly over the surface of the plate, these apertures being horizontally offset from one another so that they occur in staggered relation from one plate to the next as may be best seen in FIGS. 2 and 3. One convenient method of providing this offset relationship is to provide all plates with the same arrangement of apertures and then rotate the plates with respect to one another. This has been done in the embodiment shown in FIGS. 2 and 3 where each alternate plate is rotated 90° with respect to its adjacent plates to provide the offset relationship of the apertures. As is clearly shown in the drawings, the apertures 18 are relatively few in number relative to the total area of the horizontal plates 17.

The apertures 18 are provided with downwardly extended chimneys 19 which, in the embodiment shown, are open ended conduits, the upper rim of which is attached to the plate 17 (e.g. by welding, expanding or some other means) substantially flush with the upper surface of the plate, and the lower rim of which is spaced vertically from and out of contact with the plate beneath.

The horizontal plates 17 are maintained in spaced apart relationship and supported in the tower by means of a plurality of spacer rings 20 having a U-shaped cross section. The bottommost plate is supported in the tower by means of a ring 21 of L-shaped cross section which may be welded, bolted or otherwise rigidly attached to the wall 10 of the tower.

Desirably, the spacing rings 20 and the plates 17 are not permanently fastened inside the tower, but are stacked one upon the other and held in place by gravity. Desirably, gaskets 22 are provided betwen the outer circumference of the plates and the tower wall to prevent liquid and/or gas leakage along the tower wall.

The inter-plate spacing in the tower (the vertical distance $d$ as shown in FIG. 3 between plates) is an important consideration. In contrast to the usual spacing in perforated plate towers (of the type e.g. shown in FIG. 11) of 12 inches or more, the vertical plate spacing in accordance with the invention will range from as little as ¼" to not more than about 6" and for most applications from about 1" to 3". In general, the smaller the distance $d$, the greater will be the gas pressure drop through the unit but the greater the mass transfer rate because of the higher diffusion rate though the thinner gas space.

The total free area provided by the apertures 18 is also important. Total aperture area should comprise a minor portion of total plate area, generally from about 2% to 20% and in most cases from about 5% to 15%. As the total area of apertures 18 increases, the capacity of the tower with respect to gas and liquid flow increases. On the other hand, as the total aperture area increases the stability of the tower to changes in gas and liquid flow tends to decrease. Stability here refers to the ability of the tower to remain substantially constant in efficiency as the gas and liquid flow is varied over a given range. The choice of optimum total aperture area in any particular case will accordingly be achieved by proper balance between capacity considerations (favored by larger total area) and stability considerations (favored by relatively lower total aperture area).

The diameter of the apertures 18 and their associated chimneys should in general be of the same order of magnitude as the vertical distance $d$ between the plates, generally not less than ¼$d$ nor larger than 4$d$. The diameter of chimney 19 in most cases will range from about ½" to about 6" and more usually from about 1" to 4".

To explain the operation of the embodiment shown in FIGS. 1–3, reference is made to FIG. 10 of the drawings which shows the gas and liquid flow through the tower in diagrammatic fashion. The solid arrows 23 show the gas flow, while the broken arrows 24 show the liquid flow.

As may be seen, the liquid is spread over the surface of the plates as a thin layer of film 25 and flows downwardly from plate to plate by overflowing at the apertures 18 and flowing down the walls of the chimney and dripping from the lower lip or rim of the chimney to the plate beneath. The liquid then flows radially outwardly along the surface of the plate to the offset aperture in the next plate, again, flowing down the chimney to the next succeeding plate, and so forth. The gas passes upwardly countercurrent to the descending liquid through each of the chimneys 19, flowing radially outward from each chimney to the adjacent offset chimneys of the next plate.

From FIG. 10, the critical function of the downwardly extending chimneys in coordinating gas-liquid flow and in greatly improving gas-liquid contact is clearly apparent. This improved flow coordination and gas-liquid contact results from the fact that the chimneys cause the gas flow to be deflected downwardly along the surface of the liquid into intimate contact therewith before passing laterally into the chimneys and thence upward to the next plate. The gas and liquid travel in a more ordered countercurrent fashion since the gas is unable to bypass the liquid by flowing directly from aperture to aperture as is the case when no chimneys are provided as will be explained below.

As the gas flows laterally into the chimneys in intimate contact with the liquid surface, there is considerable agitation of the liquid layer resulting in frequent surface renewals of the liquid. Furthermore, and of great importance, the maximum pressure drop in the system occurs where the gas enters the chimneys, at which point it is being forced into intimate contact with the liquid layer. This is highly advantageous since the most efficient gas-liquid mass transfer takes place at points of maximum pressure drop, provided the gas and liquid are in contact at these points. The overall result of these considerations is considerably improved gas-liquid mass transfer rates permitting corresponding reduction of tower volume and height. Surprisingly, this increased efficiency is accompanied by a substantial decrease, rather than an increase as might be expected, in the overall gas pressure drop per unit of mass transfer.

A further advantage of the unique gas-liquid flow pattern of the invention is that the liquid layer on the plates is forced to flow radially outwardly from the bottom of the chimneys due to the increased gas pressure adjacent the chimneys. This results in a general thinning of the liquid layer below the chimneys as indicated at 26, and a general increase in the thickness of the liquid layer adjacent the apertures as indicated at 27. The thinning out of the liquid beneath the chimneys can be also seen in FIGS. 4 through 8, showing modified chimneys. The net result of this action is that the liquid is forced to flow across the surface of the plate toward the apertures thus facilitating liquid flow through the column generally. This forced flow toward the apertures helps overcome the tendency for liquid to be entrained in the gas at the lip of the apertures and also helps overcome the tendency of the upwardly flowing gas to force the liquid away from the lips of the apertures. The entrainment of the liquid in the gas stream is also minimized due to the reversal of the direction of the gas flow by virtue of the deflecting action of the chimneys.

A still further advantage of the invention is that the walls of the chimneys are wetted with liquid exposing additional liquid area to the gas and affording correspondingly higher overall rates of gas-liquid mass transfer. Desirably, the chimneys may be provided with a plurality of shallow vertical grooves (e.g. by providing them with shallow vertical corrugations) to insure uniform wetting of the entire inner surface of the chimney, or other means employed to insure such uniform wetting.

The advantages of the invention may be further appreciated by comparing the gas-liquid flow pattern of FIG. 10 to that obtained in a conventional apertured plate tower where no chimneys are provided, as shown in FIG. 11. As in FIG. 10, the gas flow is indicated by the solid arrows 23, while flow of the liquid layer 28 is indicated by the broken arrows 24. Although there is general countercurrent gas-liquid flow in the device, there is relatively poor coordination of the flow. Thus, while a portion of the gas flow can proceed in a coordinated fashion as indicated by path $a$—$b$—$c$—$d$—$e$, there is considerable bypassing as indicated by the paths $f$—$g$ and $h$—$i$. Furthermore, there is no means for causing the gas to pass in intimate contact with the liquid surface so that much of the gas passing from aperture to aperture does so without contacting the liquid surface. There is also more entrainment of the liquid away from the rims of the apertures and generally more entrainment of the liquid in the gas.

A further understanding of the advantages of the invention may be had by comparing the unique gas-liquid flow pattern of FIG. 10 to that of FIG. 12 where the chimneys associated with the apertures extend upwardly, rather than downwardly from the plates. In order to permit liquid flow, the upwardly extending chimneys 29 are provided at their base with openings 30. The liquid 31 flows through the openings 30 and drips to the surface of the plate beneath. With this type of arrangement, improved coordination of gas-liquid flow results by virtue of the chimneys. However, the gas is not forced into intimate contact with the liquid as it is in the case of the tower of the invention. Furthermore, the gas flowing up the chimneys is forced into direct impingement with the lower surface of the plate above creating considerable turbulence (as indicated by corkscrew arrows 32) and correspondingly high pressure loss. Because the gas is out of contact with the liquid at this point, this turbulence and pressure loss does not result in increased gas-liquid mass transfer and is thus wasted. Still further, because the gas is at its highest pressure at the entrance to the chimney where the liquid must pass out through holes 30, the liquid depth above the holes becomes greatly dependent on the gas pressure drop. The plate consequently has a tendency to load with liquid and once loaded (i.e. a high liquid depth) a relatively long time is required to return to normalcy. All these factors result in lower tower efficiencies and higher pressure drop as will be illustrated in the examples which follow.

An important consideration in the construction of the tower of the invention is the length of the chimneys 19 with respect to the inter-plate spacing "$d$." Generally speaking, the chimney length should range from not less than about $\frac{1}{8}d$ to not more than about $\frac{4}{5}d$, and preferably from about $\frac{1}{4}d$ to about $\frac{3}{5}d$. Optimum chimney length will vary from case to case depending chiefly upon the desired gas and liquid flow rates. At high flow rates relatively shorter chimneys are used, having a length for example from $\frac{1}{8}d$ to $\frac{1}{2}d$ while for towers designed for relatively lower gas and liquid rates somewhat longer chimneys having a length for example of from $\frac{1}{2}d$ to $\frac{4}{5}d$ may give optimum results.

In all cases the minimum clearance between the bottom of the chimney and the liquid film on the plate beneath should be at least such that the gas does not force the liquid to back up and form a column in the chimney. In such case the gas would have to enter the chimney through, rather than over, the liquid with accompanying excessive pressure drop and column flooding. Preferably the minimum clearance between the chimney bottom and plate should be such that the velocity of the gas as it enters the chimneys is equal to the velocity of the gas flowing up the chimneys. This will be true if the lateral access area to the bottom of the chimneys is equal to the cross-sectional area of the chimneys. In the embodiment of FIGS. 1–3, the lateral access area to the bottom of the chimneys is equal to $2\pi r a$ where $r$ is the inside radius of the chimney and $a$ is the vertical distance between the bottom of the chimney and the plate beneath. Thus in FIGS. 1–3, $2\pi r a$ should preferably be at least equal to the cross-sectional area of the chimneys, namely $\pi r^2$.

The minimum chimney length of about $\frac{1}{8}d$ is quite critical. As will be shown in connection with the examples which follow, the efficiency of the tower drops off rapidly if the chimney length is reduced below about $\frac{1}{8}d$, quickly approaching the low efficiency obtained when no chimneys at all are employed.

In speaking of inter-plate spacing "$d$" in connection with chimney length, it is understood that reference is intended to the effective inter-plate spacing, namely, the vertical distance between the surface of the liquid on one plate and the undersurface of the plate above. In some cases, actual and effective inter-plate spacing may differ considerably such for example as in the case where the chimneys are provided with weirs as in FIGS. 5 and 6 so as intentionally to create a deeper liquid layer on the plate.

Reference is now made to FIG. 4 which shows a modified form of chimney consisting of an open end conduit 33 attached to (e.g. by welding) and extending downwardly from plate 17', and having bottom portions 34 resting upon plate 17". To provide clearance between the chimney bottom and the plate 17" lateral openings 35 are provided in the bottom portion of the chimney permitting gas to flow laterally into the chimney over the surface of the liquid layer 36 on the plate. As shown by FIG. 4, the clearance between the bottom of the chimney and plate beneath need not be continuous. The openings 35 may be of any desired shape and rectangular, oval, etc.

Using chimneys of the type shown in FIG. 4, the chimneys themselves serve to space the plates apart from one another by virtue of the bottom portions resting upon the plate beneath. Thus, with this type of construction, the plates may be stacked one upon the other without using spacing rings 20 as shown in FIG. 3.

FIG. 5 illustrates another modified form of chimney element consisting of an open ended conduit 37, the upper rim of which is slightly flared and extends slightly above the surface of plate 17' from which it depends. This creates a slight weir 38 resulting in a slight increase in the depth of liquid on the plate. An increase in the thickness of the liquid layer on the surface of the plates over that normally obtained in the absence of a weir may be desirable in some instances. This may be desirable e.g. to insure that the entire surface of the horizontal plates are wetted by liquid despite slight deviations of the plates from the horizontal or other factors tending to cause uneven wetting of the plate surfaces. Ordinarily, the height of the weir (i.e. the distance the upper lip of the chimney extends above the plate from which it depends) should not be substantial relative to the vertical distance between plates, generally not more than $\frac{1}{10}$ to $\frac{1}{4}$ of the inter-plate spacing.

The bottom rim of the conduit 37 is serrated, as may be seen, for the purpose of coordinating the dripping of liquid from the inside surface of the conduit to the plate beneath. The liquid tends to drip in a more uniform and orderly fashion from the extremities of the serrations than from an unserrated rim.

FIG. 6 illustrates another modified chimney element comprising an open ended conduit 39, the upper rim of which extends slightly above the surface of plate 17' creating a slight weir 40 and slightly increasing the depth of the liquid layer on the plate as explained in connection with FIG. 5. Holes 41 are provided for some or all the liquid flow into the chimney depending on the liquid loading. With relatively high liquid loading some of the liquid may overflow the weir 40 as shown.

FIG 7 shows still another modified chimney element comprising an open ended conduit 42 attached at its upper end (as by welding) to the plate 17' from which it depends, substantially flush with the aperture therein. The lower portion of the chimney is flared outwardly as at 43 for the purpose of reducing the pressure drop of the gas as it enters the chimney.

FIGS. 8 and 9 illustrate still another modified form of chimney element which may be removably inserted into the apertures 18. It comprises an open ended conduit 44 having an outside diameter somewhat less than the diameter of the aperture 18 in the plate 17'. It is supported on the plate 17' from which it depends by means of lugs 45 having associated spacing tits 46. This leaves an annular opening 47 between the aperture rim and the outer wall of conduit 44. Liquid flow will occur down through annular opening 47, or for high liquid flow rates, both through annular opening 47 and the inside of conduit 44 by overspilling the top rim thereof. The annular opening 47 should, however, be small enough so that gas flow from the plate beneath occurs substantially entirely through the conduit 44 rather than opening 47.

Reference is now made to FIGS. 13 and 14 which show a modified form of the invention in which a relatively large opening 48 is provided at the periphery of each plate 17 to permit the tower to handle higher gas and liquid flows. Apertures 18 and their associated chimneys 19 are provided as in the embodiment of FIGS. 1 to 3. Openings 48 are in staggered relationship to one another such that the openings in adjacent plates are at opposite sides of the tower from one another as can be seen in FIGS. 13 and 14. With this arrangement there are in effect two types of gas flow superimposed upon one another. Some of the gas follows the path indicated in FIG. 10, namely up the chimneys, radially across to the chimneys in the next higher plate, up those chimneys, etc., as shown by the solid arrows in FIG. 14. Other portions of the gas flow up through the peripheral opening 48 in one plate, laterally across to the opening 48 in the next higher plate, etc., alternately reversing the direction of flow, as shown by the broken arrows in FIG. 14.

This embodiment has the advantage of permitting considerably increased gas and liquid flow while the tower efficiency remains relatively high. Considerably increased cross-sectional area for gas flow may be provided without substantially affecting plate stability. Generally, the peripheral openings 48 may constitute from about 2% to 25% and preferably from 4% to 15% of the total plate area in addition to the free area provided by apertures 18. The openings 48 thus relieve chimneys 19 of a substantial part of their gas carrying duty which not only permits higher gas flow but permits higher liquid flow through the chimneys without danger of liquid hold-up and flooding.

The essential function of the peripheral openings 48 is to carry gas flow, and desirably a weir 49 may be provided along the edge of openings 48 to block completely or partially the flow of liquid through these openings. However, the weir 49 can be omitted if desired. Since the ratio of periphery to area of the openings 48 is relatively low compared to the apertures 18, the amount of liquid carried by the openings 48 in the absence of a weir is correspondingly low relative to their area.

The opening 48 is conveniently provided as shown in FIGS. 13 and 14 by cutting off a peripheral segment of the plate. The shape of the opening 48, however, may vary. It may, for example, be a circular, square, rectangular, oval, etc., shaped opening provided at or close to the periphery of the plate.

Using the embodiment shown in FIGS. 13 and 14, liquid and gas rates comparable to those employed in packed towers may be attained with considerably increased mass transfer rates thus permitting attractive reductions in tower volume and height.

Reference is now made to FIGS. 16 and 17 showing a fragmentary view of another embodiment of the invention in which the plate 17 is provided with a plurality of small perforations 50, which may for example be $\frac{1}{16}''$ to $\frac{1}{4}''$ in size, in addition to the apertures 18 with their chimneys 19. The purpose of perforations 50 is to permit liquid on the plates 17 to drip down to the plate beneath and thus relieve apertures 18 of part of or even substantially all of their liquid carrying duty. This has the effect of permitting greater liquid flow rates at relatively high gas rates since liquid hold-up at the top of the chimneys due to high gas velocity is decreased because the liquid is provided with an alternate path to the next lower plate. In order to insure uniform wetting of the plates in the embodiment of FIGS. 16 and 17, it is desirable to provide a small weir 51 (which may be an extension of chimney 19) around each aperture 18 to build up a slightly increased liquid depth 52 on the plate. This encourages liquid flow through the perforations 50 and discourages liquid flow down chimneys 19, as well as insuring against gas flow up through perforations 50.

The modified form of plate shown in FIGS. 16 and 17 may, if desired, be employed in connection with the design of FIGS. 1 to 3 having apertures 18 but no peripheral opening, or with the design of FIGS. 13 and 14 where the plates have a relatively large peripheral opening 48 in addition to apertures 18. Desirably, those portions of the plate which lie directly above an aperture 18 or opening 48 are unperforated to avoid the by-passing that otherwise would occur.

The advantages of the tower of the invention are illustrated by the following examples. Examples 1 and 2 illustrate the operation of an embodiment constructed in accordance with FIGS. 1 to 3 at relatively low gas and liquid flow rates while Examples 3 and 4 illustrate the operation of an embodiment constructed in accordance with FIGS. 13 and 14 at higher gas and liquid rates.

*Example 1*

A gas-liquid contact tower constructed in accordance with FIGS. 1–3 having downwardly extending chimneys was compared with a similar tower in accordance with FIG. 11 having no chimneys using a system consisting of a concentrated calcium chloride solution passing downwardly through the column as a drying medium for a stream of humid air passing upwardly through the column. Plates having the same diameter and the same number of apertures per plate were employed in both cases with a vertical spacing of 2" between plates. Aperture and outside chimney diameter were both 2", while in each case gas flow was 162 lbs./hr. per square foot of tower cross section while liquid flow was 143 lbs./hr. per square foot of tower cross section. The chimneys were 1.25" long, with a clearance of 0.75" between the bottom of the chimney and the plate beneath. The results were as follows:

|  | Tower of FIGS. 1-3 | Tower of FIG. 11 |
|---|---|---|
| $K_{Ga}$ [1] | 10.20 | 6.21 |
| $H_{OG}$ [2] | 0.55 | 0.90 |
| T.U./plate [3] | 0.303 | 0.185 |
| Delta P/T.U. [4] (inches H₂O) | 0.25 | 0.62 |

[1] $K_{Ga}$=Lb. moles of H²O absorbed per hour per cubic foot of tower volume per atmosphere driving force (i.e. rate of mass transfer between gas and liquid).
[2] $H_{OG}$=Height of an overall gas-film transfer unit in feet.
[3] T.U.=Transfer unit (i.e. corresponding to transfer accomplished by one 100% efficient theoretical plate). T.U./plate is thus a measure of plate efficiency.
[4] Delta P/T.U.=Pressure drop associated with one transfer unit.

*Example 2*

A gas-liquid contact tower constructed in accordance with FIGS. 1–3 was compared with a similar tower in accordance with FIG. 12 having upwardly rather than downwardly extending chimneys using the same system as in Example 1. Plates of the same diameter and having the same number of apertures per plate were employed in both cases with vertical spacing of 2½" between plates. Chimney inside diameters in both cases were $1\frac{13}{16}''$ while in each case gas flow was 162 lbs./hr. per foot of tower cross section and liquid flow was 155 lbs./hr. per square foot of tower cross-section. The chimneys were in both cases $1\frac{13}{16}''$ long with $\frac{13}{16}''$ clearance between the bottom of the downwardly extending chimney and the plate beneath in the one case and the same clearance between the top of the upwardly extending chimney and the plate above in the other. The results were as follows:

|  | Tower of FIGS. 1-3 | Tower of FIG. 12 |
|---|---|---|
| $K_G a$ | 5.07 | 4.44 |
| $H_G a$ | 1.10 | 1.26 |
| T.U./plate | 0.188 | 0.165 |
| Delta P/T.U. (inches of $H_2O$) | 1.30 | 2.50 |

As may be seen, the tower constructed in accordance with the invention provided substantially increased gas-liquid transfer efficiencies at approximately one-half of the overall pressure drop.

*Example 3*

A tower constructed in accordance with FIGS. 13 and 14 was employed having 6 plates 24″ in diameter with vertical inter-plate spacing of 2″, each plate having 8 apertures about 2¼″ in diameter, the total area of the 8 apertures being about 7.3% of the total area of the plate. Each plate in addition was provided with a peripheral opening similar to the openings 48 in FIGS. 13 and 14 having an area of 20 square inches. The total free area provided by the 8 apertures and the peripheral opening combined was 12% of the total area of the plate. Three runs were made using concentrated aqueous calcium chloride as a liquid absorbent and humidified air as the gas. In Run A the chimneys associated with the apertures were .44″ in length; in Run B, the chimneys were 0.19″ in length; while in Run C, no chimneys were used. In Run A, the chimneys were about ¼ of the effective interplate spacing (¼ d) while in Run B, the chimneys were only about ⅛ d. At liquid rates of 1000 lb. per square foot of tower cross-sectional area per hour and gas rates of 400 lb. per square foot of tower cross-sectional area per hour the $K_G a$, H.T.U./ft., T.U. per plate and Delta P/T.U. were determined in Runs A, B and C with the following results:

| Run | Chimney length, inches | Gas rate, lb./ft.²/hr. | Liquid rate, lb./ft.²/hr. | $K_G a$, lb. moles ft.³/hr./atm. | H.T.U., ft. | T.U./plate | Delta P/T.U. |
|---|---|---|---|---|---|---|---|
| A | .44 | 400 | 1,000 | 10.6 | 1.31 | 0.135 | 1.14 |
| B | .19 | 400 | 1,000 | 5.75 | 2.40 | 0.074 | 1.67 |
| C | 0.0 | 400 | 1,000 | 5.45 | 2.53 | 0.070 | 2.28 |

It will be noted that the mass transfer rate ($K_G a$), and the plate efficiency (T.U./plate) in Run A (using a chimney length of approximately ¼ d) are approximately double the values obtained in Run B (where chimneys approximately ⅛ d are employed) and in Run C when no chimneys are used, while the height per transfer unit (H.T.U.) in Run A is approximately half that in Runs B and C. At the same time, the pressure drop per transfer unit (Delta P/T.U.) in Run A is considerably lower than that in Runs B and C.

These examples illustrate the critical effect of chimney length on the tower efficiency. The effect can be seen more readily by reference to FIG. 15 where the results of the foregoing examples are shown graphically. Chimney length in inches is plotted against height per transfer unit (H.T.U.) on the left hand ordinate and against plate efficiency on the right hand ordinate. As can be seen, as the chimney length decreases from 0.4–0.5 inch (approximately ¼ d) to about 0.2 inch (approximately ⅛ d), the plate efficiency drops, and the H.T.U. increases, almost to the values obtained using no chimneys at all.

*Example 4*

This example illustrates the advantages of a tower constructed in accordance with FIGS. 13 and 14 over the tower of FIGS. 1–3 where relatively high gas and liquid rates are involved. In both cases, a tower was employed having 6 plates, each 24″ in diameter, with vertical inter-plate spacing of 1½″, each plate having 8 chimneys ½″ long and 2¼″ in diameter, the total area of the 8 chimneys apertures being 7.3% of the total area of the plate. In Runs A and B each plate was provided with a peripheral opening as in FIGS. 13–14 having an area of 20 square inches such that the total combined free area of the chimney apertures and the peripheral opening was 12% of the total plate area. In Runs C and D, the peripheral openings were omitted. Using aqueous calcium chloride and humidified air as in the previous examples, the results were as follows:

| Run | Liquid rate, lbs./ft.²/hr. | Gas rate, lbs./ft.²/hr. | Delta P/T.U. |
|---|---|---|---|
| Run A—12% free area | 800 | 200 | 0.19 |
| Run B—12% free area | 2,000 | 200 | 0.28 |
| Run C—7.3% free area | 800 | 200 | 0.50 |
| Run D—7.3% free area | 2,000 | 200 | Flooding |

As can be seen, the pressure drop per transfer unit is greatly improved by using the embodiment of FIGS. 13 and 14 at relatively high gas and liquid rates.

The invention may be employed in any application where gas-liquid contact in countercurrent fashion is desired. It will find particular application in gas-liquid absorption processes where low liquid rates are desired and relatively high gas rates are desired. In air conditioning, for example, large quantities of air must be contacted with small quantities of desiccant solution to dehumidify the air. It is of particular interest, in fact, in all gas drying applications where liquid desiccants are employed, such, for example, as drying wet chlorine from electrolytic cells by contact with concentrated sulphuric acid. With the greater efficiency obtainable through the use of the invention, the liquid circulation rate may be reduced in contrast, for example, to that required in a packed tower, which, of course, is highly desirable.

Another particularly advantageous application of the invention is in vacuum distillation. Here it is important to maintain as low a pressure drop as possible for a given liquid separation. Owing to the low pressure drop per transfer unit characteristic of the invention, lower still pot pressures are obtained under given operating conditions than with conventional devices. This in turn results in lower absolute pressures in the still pot reducing the boiling point of the charge. This not only results in increased throughput for a given operating temperature but because of the lower operating temperature results in less pyrolysis of heat sensitive materials with correspondingly higher yields of the desired distillate.

This application is a continuation in part of U.S. application, Ser. No. 780,600, filed December 15, 1958, by Max Leva for Gas-Liquid Contact Tower, now abandoned, which in turn is a continuation in part of U.S. patent application Ser. No. 722,313, filed March 18, 1958, by Max Leva, now abandoned.

I claim:
1. Gas-liquid contact tower comprising a plurality of super-imposed horizontal plates vertically spaced apart from one another and adapted to accommodate a flow of liquid thereover in a relatively thin layer, means for introducing liquid at the top of said tower, means for withdrawing said liquid from the bottom of said tower, means for introducing gas at the bottom of said tower, means for withdrawing said gas from the top of said tower, a plurality of apertures in said plates, the apertures in adjacent plates being horizontally offset from one another, said apertures permitting liquid flowing over the surface of said plates to flow downwardly through said tower from plate to plate and permitting gas to flow upwardly through said tower countercurrent to said liquid, open chimneys free from restrictions to gas flow extending downwardly from said apertures, the upper portions of said chimneys being substantially flush with the upper surfaces of said plates and the upper surfaces of said plates being flat and uninterrupted except at said apertures whereby liquid flows over said plates in a thin, continuous film uninterrupted except at said apertures, said apertures occupying not more than 15% of the total area of said plates and being relatively few in number relative to the total area of said plate, whereby said apertures and associated chimneys are separated from one another by substantial horizontal distances thereby promoting substantial horizontal flow of gas between said plates, said chimneys terminating at their lower portions above the liquid level on the plate beneath such that gas flowing horizontally between said plates flows into said chimneys while passing over, rather than through, said liquid film, said chimneys serving to deflect said horizontally flowing gas downwardly toward the uninterrupted liquid film beneath said chimneys before passing upwardly through said chimneys to the next plate.

2. Gas-liquid contact tower in accordance with claim 1 in which said chimneys comprise open-ended conduits depending from said plates and having lower rims vertically spaced from, and out of contact with, the plates beneath, the length of said downwardly extending chimneys being from $1/3$ to $4/5$ of the effective inter-plate spacing.

3. Gas-liquid contact tower in accordance with claim 1 in which the vertical distance between said plates is from $1/4''$ to $6''$.

4. Gas-liquid contact tower in accordance with claim 1 in which said horizontal plates are provided with peripheral openings which are large relative to the size of said apertures, said openings being provided with weirs to prevent liquid from flowing therethrough thereby serving only for the passage of gas, the peripheral openings in adjacent plates being located at essentially opposite sides of said tower.

References Cited in the file of this patent

UNITED STATES PATENTS

| | | |
|---|---|---|
| 1,723,657 | Pavitt | Aug. 6, 1929 |
| 1,886,957 | Huff | Nov. 8, 1932 |
| 2,078,288 | Sherman | Apr. 27, 1937 |
| 2,153,507 | Mann | Apr. 4, 1939 |
| 2,460,706 | Metzner | Feb. 1, 1949 |
| 2,652,239 | Ballenger | Sept. 15, 1953 |
| 2,727,882 | Vodonik | Dec. 20, 1955 |
| 2,872,295 | Pohlenz | Feb. 3, 1959 |
| 2,968,437 | Mobley | Jan. 17, 1961 |

FOREIGN PATENTS

| | | |
|---|---|---|
| 41,740 | Austria | Oct. 15, 1909 |